(12) United States Patent
Hinque et al.

(10) Patent No.: US 9,056,435 B2
(45) Date of Patent: Jun. 16, 2015

(54) SECURING TO A PNEUMATIC TIRE (71) Applicant: The Goodyear Tire & Rubber Company, Akron, OH (US)

(72) Inventors: Daniel Paul Luc Marie Hinque, Habay-la-Neuve (BE); Anne Therese Peronnet-Paquin, Grand-Duchy of Luxembourg (LU); Yannick Raymond Georges Haegel, Villeneuve d'ascq (FR); Gilles Bonnet, Niederfeulen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/580,673

(22) Filed: Dec. 23, 2014

(65) Prior Publication Data

US 2015/0137420 A1    May 21, 2015

Related U.S. Application Data

(62) Division of application No. 13/672,737, filed on Nov. 9, 2012.

(51) Int. Cl.
*B21D 53/26* (2006.01)
*B29D 30/00* (2006.01)
*B29D 30/06* (2006.01)
*B29K 105/24* (2006.01)
*B60C 23/04* (2006.01)

(52) U.S. Cl.
CPC ........ *B29D 30/0061* (2013.01); *B29D 30/0601* (2013.01); *B29D 30/0654* (2013.01); *B29D 2030/0072* (2013.01); *B29K 2105/246* (2013.01); *B29D 30/00* (2013.01); *Y10T 29/49538* (2015.01); *Y10T 152/10495* (2015.01); *B60C 23/0493* (2013.01)

(58) Field of Classification Search
CPC ............... B29D 30/0061; B29D 30/00; B29D 30/0601; B29D 30/00654; B29D 2030/0072; B29K 2105/246; B60C 23/0493; Y10T 152/10495; Y10T 29/49538
See application file for complete search history.

(56) References Cited

U.S. PATENT DOCUMENTS

| 5,479,171 A | 12/1995 | Schuermann |
| 5,500,065 A | 3/1996 | Koch et al. |
| 5,562,787 A | 10/1996 | Koch et al. |
| 5,573,610 A | 11/1996 | Koch et al. |
| 5,573,611 A | 11/1996 | Koch et al. |

(Continued)

FOREIGN PATENT DOCUMENTS

EP    1721760 A1    11/2006

OTHER PUBLICATIONS

European Search Report dated Feb. 4, 2014, 3 pages.

*Primary Examiner* — Ryan J Walters
(74) *Attorney, Agent, or Firm* — Robert N. Lipcsik (57) ABSTRACT

A pneumatic tire assembly includes a pneumatic tire having an inner cavity and an inner surface at least partially defining the inner cavity, a rigid structure for facilitating operation of the tire assembly, and a docking base for securing the rigid structure to the inner surface of the inner cavity. The docking base has been integrally bonded to the inner surface during curing of the pneumatic tire. The docking base has a shape formed by a mold attached to the inner surface of the inner cavity during curing of the pneumatic tire. The mold subsequently is removed thereby resulting in the docking base integrally secured to the inner surface.

1 Claim, 3 Drawing Sheets

(56) References Cited

U.S. PATENT DOCUMENTS

| | | |
|---|---|---|
| 5,590,844 A | 1/1997 | Hatakeyama et al. |
| 5,971,046 A | 10/1999 | Koch et al. |
| 6,030,478 A | 2/2000 | Koch et al. |
| 6,161,430 A | 12/2000 | Koch et al. |
| 6,217,683 B1 | 4/2001 | Balzer et al. |
| 6,244,104 B1 | 6/2001 | Koch et al. |
| 6,255,940 B1 | 7/2001 | Phelan et al. |
| 6,309,494 B1 | 10/2001 | Koch et al. |
| 6,388,567 B1 | 5/2002 | Bohm et al. |
| 6,443,198 B1 | 9/2002 | Koch et al. |
| 6,444,069 B1 | 9/2002 | Koch et al. |
| 6,462,650 B1 | 10/2002 | Balzer et al. |
| 6,474,380 B1 | 11/2002 | Rensel et al. |
| 6,524,415 B1 | 2/2003 | Youngman et al. |
| 6,653,936 B2 | 11/2003 | Bohm et al. |
| 6,668,884 B2 | 12/2003 | Koch et al. |
| 6,782,741 B2 | 8/2004 | Imbert |
| 6,788,192 B2 | 9/2004 | Shimura |
| 6,860,303 B2 | 3/2005 | Rensel et al. |
| 7,009,576 B2 | 3/2006 | Adamson et al. |
| 7,028,732 B1 | 4/2006 | Phelan et al. |
| 7,186,308 B2 | 3/2007 | Metcalf et al. |
| 7,220,330 B2 | 5/2007 | Tubb et al. |
| 7,430,900 B2 | 10/2008 | Belanger |
| 7,598,877 B2 | 10/2009 | Lionetti |
| 7,874,205 B2 * | 1/2011 | Hironaka ............... 73/146 |
| 7,900,665 B2 | 3/2011 | Shimura |
| 2007/0169865 A1 * | 7/2007 | Ichikawa et al. ........... 152/152.1 |

* cited by examiner

SECURING TO A PNEUMATIC TIRE

FIELD OF THE INVENTION

The invention relates generally to securing parts to a pneumatic tire and, more specifically, to securing parts of a pumping assembly to a pneumatic tire.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate an air maintenance feature within a tire that will maintain air pressure within the tire in order to compensate for any reduction in tire pressure over time without the need for driver intervention.

SUMMARY OF THE INVENTION

A pneumatic tire assembly in accordance with the present invention includes a pneumatic tire having an inner cavity and an inner surface at least partially defining the inner cavity, a rigid structure for facilitating operation of the tire assembly, and a docking base for securing the rigid structure to the inner surface of the inner cavity. The docking base has been integrally bonded to the inner surface during curing of the pneumatic tire. The docking base has a shape formed by a mold attached to the inner surface of the inner cavity during curing of the pneumatic tire. The mold subsequently is removed thereby resulting in the docking base integrally secured to the inner surface.

According to another aspect of the pneumatic tire assembly, the inner surface of the tire cavity maintains pressurized air within the inner cavity.

According to still another aspect of the pneumatic tire assembly, the rigid structure is a hydraulic pump for maintaining air in the inner cavity of an air maintenance tire.

According to yet another aspect of the pneumatic tire assembly, the mold is formed from silicone.

According to still another aspect of the pneumatic tire assembly, the rigid structure is an electronic sensor.

According to yet another aspect of the pneumatic tire assembly, the rigid structure is a balancing weight for the pneumatic tire.

According to still another aspect of the pneumatic tire assembly, the rigid structure is an air compressor for maintaining air in the inner cavity of an air maintenance tire.

According to yet another aspect of the pneumatic tire assembly, a second docking base secures a second rigid structure to the inner surface of the inner cavity. The second docking base has been integrally bonded to the inner surface during curing of the pneumatic tire. The second docking base has a shape formed by a second mold attached to the inner surface of the inner cavity during curing of the pneumatic tire. The second mold subsequently is removed thereby resulting in the second docking base integrally secured to the inner surface.

According to still another aspect of the pneumatic tire assembly, the rigid structure is a hydraulic pump for maintaining air in the inner cavity of an air maintenance tire and the second rigid structure is an air compressor for maintaining air in the inner cavity of the air maintenance tire.

According to yet another aspect of the pneumatic tire assembly, the docking base includes a lever arm for facilitating operation of the rigid structure.

A method in accordance with the present invention secures a device to a pneumatic tire. The method comprises the steps of: positioning a mold and green rubber within the mold on an inner surface of an inner cavity of a green tire; securing the mold and green rubber to the inner surface; locating the green tire within a vulcanizing press; curing the green tire by the vulcanizing press; removing the cured tire from the vulcanizing press; removing the mold from the inner surface; and securing the device to a docking base formed integral to the inner surface by the mold.

According to another aspect of the method, another step comprises filling the mold with green rubber.

According to still another aspect of the method, another step comprises applying heat and pressure by a bladder to the mold and surrounding green rubber thereby molding the rubber of the green tire and the green rubber within the mold together with an appropriate shape.

According to yet another aspect of the method, another step comprises shaping the green rubber of the mold into a lever arm for facilitating operation of the device.

According to still another aspect of the method, further steps include: securing a second mold and more green rubber to the inner surface prior to curing the green tire; removing the second mold from the inner surface subsequent to removing the cured tire from the vulcanizing press; and securing a second device to a second docking base formed integral to the inner surface by the second mold.

A system in accordance with the present invention maintains air pressure within a cavity of a pneumatic tire. The system includes a structure for facilitating operation of the system and a docking base for securing the structure to an inner surface of the cavity. The docking base has been integrated to the inner surface during curing of the pneumatic tire. The docking base has a shape formed by a mold attached to the inner surface of the cavity during curing of the pneumatic tire. The mold subsequently is removed thereby resulting in the docking base integral to the inner surface.

According to another aspect of the system, the docking base is shaped inverse correspondingly to the structure.

According to still another aspect of the system, a second docking base for a second structure facilitates operation of the system.

According to yet another aspect of the system, the structure is a hydraulic pump secured to the pneumatic tire by the docking base.

According to still another aspect of the system, the second structure is an air compressor secured to the pneumatic tire by a second docking base.

A pneumatic tire assembly for use with the present invention comprises: a tire having a pneumatic cavity; a rigid structure for facilitating operation of the tire assembly, the rigid structure being bonded to the tire by a layered thermoplastic material such that a stiffness gradient is created between the structure and the tire; first and second sidewalls extending respectively from first and second tire bead regions to a tire tread region, the first sidewall having at least one bending region operatively bending when radially within a rolling tire footprint; and a sidewall groove defined by groove walls positioned within the bending region of the first tire sidewall, the sidewall groove deforming segment by segment between a non-deformed state and a deformed, constricted state in response to bending of the bending region of the first sidewall while radially within the rolling tire footprint. An air passageway is defined by the sidewall groove and deforms segment by segment between an expanded condition and an at least partially collapsed condition in response to respective segment by segment deformation of the sidewall groove when radially within the rolling tire footprint.

According to another aspect for use with the present invention, the thermoplastic material is selected from the group consisting of polyethylene, polypropylene, polyamide, polyester, polyphenylene ether, and polyphthalamide.

According to still another aspect for use with the present invention, the thermoplastic material is polyethylene.

According to yet another aspect for use with the present invention, the rigid structure further comprises an adhesive selected from the group consisting of an RFL adhesive and an epoxy-based adhesive.

According to still another aspect for use with the present invention, the thermoplastic material comprises a plurality of thermoplastic layers.

According to yet another aspect for use with the present invention, the thermoplastic material comprises a plurality of thermoplastic layers wherein the thermoplastic layers have a layer thickness ranging from 0.1 to 1 mm.

According to still another aspect for use with the present invention, the thermoplastic material comprises at least ten thermoplastic layers.

According to yet another aspect for use with the present invention, the thermoplastic material comprises a plurality of thermoplastic layers with an adhesive disposed between the thermoplastic layers.

According to still another aspect for use with the present invention, the thermoplastic material comprises at least ten thermoplastic layers with an adhesive disposed between the thermoplastic layers.

According to yet another aspect for use with the present invention, the rigid structure is constructed of ultra high molecular weight polyethylene.

According to still another aspect for use with the present invention, the rigid structure and the tire define a built-in tube-like cavity.

According to yet another aspect for use with the present invention, the rigid structure and the tire reroute pressurized air to a pump assembly, and from there, into the pneumatic cavity.

According to still another aspect for use with the present invention, a separate tube is disposed within the sidewall groove, the separate tube defining a circular air passageway.

According to yet another aspect for use with the present invention, the separate tube has an outer profile corresponding to an inner profile of the sidewall groove.

According to still another aspect for use with the present invention, the rigid structure comprises a plurality of check valves disposed at multiple arcuate positions about the sidewall groove.

According to yet another aspect for use with the present invention, the rigid structure and the tire define a built-in tube-like cavity; and the rigid structure and the tire reroute pressurized air to a pump assembly, and from there, into the pneumatic cavity.

According to still another aspect for use with the present invention, a subcoat is applied to a bare surface of the rigid structure; and a topcoat applied to the subcoat.

According to yet another aspect for use with the present invention, the compound cement is applied to the topcoat.

According to still another aspect for use with the present invention, the subcoat is dried to the bare surface of the rigid structure at 180 C for 8 min.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tire dimensioned and configured in section for receipt of an air tube therein.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by a shape with adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF EXAMPLES OF THE PRESENT INVENTION

An example tire assembly may include a tire, a peristaltic pump assembly, and a tire rim. The tire may mount in conventional fashion to a pair of rim mounting surfaces adjacent outer rim flanges. The rim flanges may each have a radially outward facing flange end. A rim body may support the tire assembly. The tire may be of conventional construction, having a pair of sidewalls extending from opposite bead areas to a crown or tire tread region. The tire and rim may enclose a tire cavity.

The example peristaltic pump assembly may include an annular air tube that encloses an annular passageway. The tube may be formed of a resilient, flexible material such as plastic or rubber compounds that are capable of withstanding repeated deformation cycles of a flattened condition subject to external force and, upon removal of such force, returned to an original condition generally circular in cross-section. The tube may have a diameter sufficient to operatively pass a volume of air for purposes described herein and allowing a positioning of the tube in an operable location within the tire assembly. In one example configuration, the tube may be an elongate, generally elliptical shape in cross-section, having opposite tube sidewalls extending from a flat (closed) trailing tube end to a radiussed (open) leading tube end. The tube may have a longitudinal outwardly projecting pair of locking detent ribs of generally semi-circular cross-section and each rib extending along outward surfaces of the sidewalls, respectively.

The example tube may have a length within a range of 3.65 mm to 3.80 mm; a width within a range of 2.2 mm to 3.8 mm; and a trailing end width within a range of 0.8 mm to 1.0 mm. The protruding detent ribs may each have a radius of curvature within a range of 0.2 mm to 0.5 mm and each rib may be located at a position distance within a range of 1.8 mm to 2.0 mm of the trailing tube end. The leading end of the tube may have a radius within a range of 1.1 mm to 1.9 mm. The air passageway within the tube may likewise be generally elliptical with a length within a range of 2.2 mm to 2.3 mm; and a width within a range of 0.5 mm to 0.9 mm.

The tube may be profiled and geometrically configured for insertion into a groove. The groove may have an elongate, generally elliptical configuration with a length within a range of 3.65 mm to 3.80 mm complementary to the elliptical shape of the tube. The groove may include a restricted narrower entryway having a nominal cross-sectional width within a range of 0.8 mm to 1.0 mm. A pair of groove-rib receiving axial detent channels of semi-circular configuration may be formed within opposite sides of the groove for corresponding receipt of the tube locking ribs. The channels may be spaced approximately a distance within a range of 1.8 mm to 2.0 mm of the groove entryway. Detent channels may each have a radius of curvature within a range of 0.2 mm to 0.5 mm. An inward detent groove portion may be formed with a radius of curvature within a range of 1.1 mm to 1.9 mm and a cross-sectional nominal width within a range of 2.2 mm to 3.8 mm.

The tire may further form one or more compression ribs extending the circumference of, and projecting into, the groove. The ribs may form a pattern of ribs of prescribed pitch, frequency, and location. The ribs may be formed in a sequence and pitch pattern in order to optimize the pumping of air through the tube passageway. The ribs may each have a unique and predetermined height and placement within the pattern and project outward into the groove at a radius within a range of 0.95 mm to 1.60 mm.

The peristaltic pump assembly may further include an inlet device and an outlet device spaced apart approximately 180 degrees at respective locations along the circumferential air tube. The example outlet device may have a T-shaped configuration in which conduits direct air to, and from, the tire cavity. An outlet device housing may contain conduit arms that integrally extend from respective conduits. Each of the conduit arms may have external coupling ribs for retaining the conduits within disconnected ends of the air tube in the assembled condition. The housing may be formed having an external geometry that complements the groove and includes a flat end, a radiused generally oblong body, and outwardly projecting longitudinal detent ribs. The housing may thus be capable of close receipt into the groove at its intended location with the ribs registering within the groove.

The inlet device may include an elongate outward sleeve body joining an elongate inward sleeve body at a narrow sleeve neck. The outward sleeve body may be generally triangular in section. The inward sleeve body may have an oblong external geometry complementary to the groove and may include a pair of detent ribs extending longitudinally along the inward sleeve body. An elongate air entry tube may be positioned within the inward sleeve body and may include opposite tube ends and a pattern of entry apertures extending into a central tube passageway. External ribs may secure the tube ends in the air tube opposite the outlet device.

The pump assembly may comprise the air tube and inlet and outlet devices affixed in-line to the air tube at respective locations 180 degrees apart when inserted into the groove. The groove may be located at a lower sidewall region of the tire that, when the tire is mounted to the rim, positions the air tube above the rim flange ends. Upon full insertion, the ribs may register within the groove channels and the flat outer end of the tube may be generally coplanar with the outer surface of the sidewall of the tire. Once fully inserted, the air passageway of the tube may elastically restore itself into an open condition to allow the flow of air along the tube during operation of the pump.

The inlet device and the outlet device may be positioned within the circumference of the circular air tube generally 180 degrees apart. The tire with the tube positioned within the groove rotates in a direction of rotation, causing a footprint to be formed against the ground surface. A compressive force is directed into the tire from the footprint and acts to flatten a segment of the air tube passageway adjacent the footprint. Flattening of a segment of the passageway forces air from the segment along the tube passageway in a direction toward the outlet device.

As the tire continues to rotate along the ground surface, the tube may be sequentially flattened or squeezed adjacent the tire footprint, segment by segment, in a direction opposite to the direction rotation. A sequential flattening of the tube passageway, segment by segment, may cause evacuated air from the flattened segments to be pumped in the direction of rotation within the tube passageway toward the outlet device. Air may flow through the outlet device and to the tire cavity. Air exiting the outlet device may be routed to the tire cavity and serve to re-inflate and/or sustain the tire at a desired pressure level. A valve system to regulate the flow of air to the cavity, when the air pressure within the cavity falls to a prescribed level, is shown and described in pending U.S. patent application Ser. No. 12/775,552, published as US 2011/0272073, filed May 7, 2010, and incorporated herein by reference; and also in pending U.S. patent application Ser. No. 13/561,155, filed Jul. 30, 2012, and incorporated herein by reference.

With the tire rotates, flattened tube segments may be sequentially refilled by air flowing into the inlet device. The inflow of air into the inlet device, and then into the tube passageway, may continue until the outlet device, rotating in a counterclockwise direction, moves away from or passes the tire footprint. The tube may continue to be sequentially flattened, segment by segment, adjacent the tire footprint by a compressive force of the vehicle load. Air may be pumped in the clockwise direction to the inlet device and evacuated or exhausted external to the tire. Passage of exhaust air from the inlet device may occur through a filter sleeve exemplarily formed of a cellular or porous material or composite. Flow of air through the filter sleeve and into the tube may thus cleanse debris or particulates from the inlet air. In an exhaust or reverse flow of air direction, the filter sleeve may be cleansed of trapped accumulated debris or particles within the porous medium. With the evacuation of pumped air out of the inlet device, the outlet device may be in a closed position preventing air flow to the tire cavity. When the tire rotates further in a counterclockwise direction until the inlet device moves toward the tire footprint, the airflow may resume to the outlet device and cause the pumped air to flow into the tire cavity. Air pressure within the tire cavity may thus be maintained at a desired level.

The tube may be flattened, segment by segment, as the tire rotates. A flattened segment may move counterclockwise as it is rotated away from the tire footprint while an adjacent segment moves adjacent the tire footprint and is flattened. Accordingly, the progression of squeezed or flattened or closed tube segments may move air toward the outlet device or the inlet device depending on the rotational position of the tire relative to these devices. As each segment is moved by tire rotation away from the tire footprint, the compression forces within the tire from the footprint region may be eliminated and the segment may resiliently reconfigure into an unsqueezed or unflattened or open condition as the segment refills with air from the passageway. In the original non-flattened configuration, segments of the tube may resume the exemplary oblong generally elliptical cross-sectional shape.

The above-described cycle may repeat for each tire revolution, with half of each rotation resulting in pumped air to the tire cavity and half of each rotation resulting in pumped air moving back out the filter sleeve of the inlet device for self-cleaning of the filter. It may be appreciated that while the direction of rotation of the tire may be counterclockwise, the example tire assembly and its peristaltic pump assembly may function in a like manner in a clockwise direction of rotation as well. The peristaltic pump assembly may accordingly be bi-directional and equally functional with the tire and vehicle moving in a forward or reverse direction of rotation and forward or reverse direction of the vehicle.

The tube may be located within the groove in a lower region of the sidewall of the tire. The passageway of the tube may closed by compression strain bending of the sidewall groove within or adjacent the rolling tire footprint. The location of the tube in the sidewall may provide freedom of placement thereby avoiding contact between the tube and the rim. Higher placement of the tube in the sidewall groove may use high deformation characteristics of this region of the sidewall as it passes through or adjacent the tire footprint to close the tube.

The configuration and operation may be a variable pressure pump compression of the tube by operation of ridges or compression ribs within the groove. The groove may be uniform width circumferentially along the side of the tire with the molded ridges/ribs formed to project into the groove in a preselected sequence, pattern, or array. The ridges may retain the tube in a predetermined orientation within the groove and also may apply a variable sequential constriction/closing force to the tube.

The uniformly dimensioned pump tube may be positioned within the groove by mechanically spreading the entryway of the groove apart. The tube may then be inserted into the enlarged entryway of the groove. The entryway of the groove may thereafter be released to return to close into its original spacing thereby capturing the tube inside the groove. Longitudinal locking ribs of the tube may thus be capture/lock the tube into the longitudinal groove. The locking ribs resultingly operate to lock the tube inside the groove and prevent ejection of the tube from the groove during tire operation/rotation. Alternatively, the tube may be pressed into the groove.

The tube, being of uniform width dimensions and geometry, may be manufactured in large quantities. Moreover, a uniform dimensioned pump tube may reduce overall assembly time, material cost, and non-uniformity of tube inventory. From a uniformity perspective, this results in less scrap.

The circumferential ridges projecting into the groove may increase in frequency (number of ridges per axial groove unit of length) toward the inlet passage of the tube, adjacent the outlet device. Each of the ridges may have a common radius dimension within a range of 0.15 mm to 0.30 mm. The spacing between ridges may be largest, the spacing between the next largest, and so on until the spacing between ridges is nominally eliminated. More or fewer ridges may be deployed at various frequency along the groove.

The projection of the ridges into the groove by a radius may serve a twofold purpose. First, the ridges may engage the tube and prevent the tube from migrating, or "walking", along the groove during tire operation/rotation from the intended location of the tube. Secondly, the ridges may compress the segment of the tube opposite each ridge to a greater extent as the tire rotates through its rotary pumping cycle. The flexing of the sidewall may manifest a compression force through each ridge and may constrict/close the tube segment adjacent such ridge to a greater extent than otherwise would occur in tube segments adjacent non-ridged portions of the groove. As the frequency of the ridges increases in the direction of air flow, a pinching of the tube passageway may progressively occur until the passageway constricts, gradually reducing the air volume and increasing the air pressure.

As a result, with the presence of the ridges, the groove may provide variable pumping pressure within the tube configured to have a uniform dimension therealong. As such, the sidewall groove may be a variable pressure pump groove functioning to apply a variable pressure to a tube situated within the groove. It will be appreciated that the degree of pumping pressure variation may be determined by the pitch or ridge frequency within the groove and the amplitude of the ridges deployed relative to the diametric dimensions of the tube passageway. The greater the ridge amplitude relative to the diameter, the more air volume may be reduced in the tube segment adjacent the ridge and pressure increased, and vice versa.

From the forgoing, it will be appreciated that the example assembly may comprise a bi-directionally peristaltic pump assembly for air maintenance of a tire. The circular air tube may flatten, segment by segment, and close when adjacent the tire footprint. The air inlet device may include an outer filter sleeve formed of porous cellular material and thereby render the air inlet device self-cleaning. The outlet device may employ a valve unit. The peristaltic pump assembly may pump air through rotation of the tire in either direction, one half of a revolution pumping air to the tire cavity and the other half of a revolution pumping air back out of the inlet device. The peristaltic pump assembly may be used with a secondary tire pressure monitoring system (TPMS) (not shown) that may serve as a system fault detector. The TPMS may be used to detect any fault in the self-inflation system of the tire assembly and alert the user of such a condition.

The tire air maintenance system may further incorporate a variable pressure pump groove with one or more inwardly directed ridges or ribs engaging and compressing a segment of the air tube adjacent such rib(s). The pitch or frequency of the ribs may increase toward the outlet device for gradually reducing air volume within the passageway by compressing the tube. The reduction in air volume may increase air pressure within the passageway and thereby facilitate a more efficient air flow from the tube into the tire cavity. The increase in tube pressure may be achieved by engagement by the ribs of the groove and the tube having uniform dimensions along the tube length. The tube may thus be made of uniform dimension and of relatively smaller size without compromising the flow pressure of air to the tire cavity for maintaining air pressure. The pitch and amplitude of the ridges may both be varied to better achieve the desired pressure increase within the passageway.

Structures in a pneumatic tire may require the attaching or securing of certain parts, functional devices, and/or connectors to a rubber part of the tire (e.g., the innerliner). For example, the structures of the example air maintenance tire described above may require attaching to the tire within the tire cavity. Such structures typically encounter high stresses during operating conditions of the tire. Thus, strong attachment of such structures is desired since a bond break at the structure's surface will likely lead to destruction of the assembly and/or the integrity of the tire as a whole.

A method in accordance with the present invention may mold a shape on the inside surface/innerliner of a tire cavity. The method may include the step of filling a silicone mold/patch with green rubber and place it on the inside of the tire cavity of the green tire. The inner surface of the mold may be shaped correspondingly to the object to be secured/molded to the inside surface/innerliner of the pneumatic tire. After the installation of the silicone mold containing the green rubber on the surface of the green tire, the green tire and silicone mold are cured in a vulcanizing press.

The bladder of the vulcanizing press may apply pressure and heat to the silicone mold and surrounding green rubber thereby molding the rubber of the green tire with the appropriate shape and curing/vulcanizing/stabilizing the rubber around the silicone mold. The silicone mold may then be removed after the tire is removed from the press. Such a method may form a docking base for the hydraulic pump (AMT) described above. Further, the method may create any fixation system inside the cured pneumatic tire (e.g., for an electronic or other sensor, a balancing weight, an air compressor, etc). Additionally, the silicone mold may shape the rubber of the green tire into a functioning device such as a lever arm for facilitating actuation of a hydraulic pump.

Figure 1:
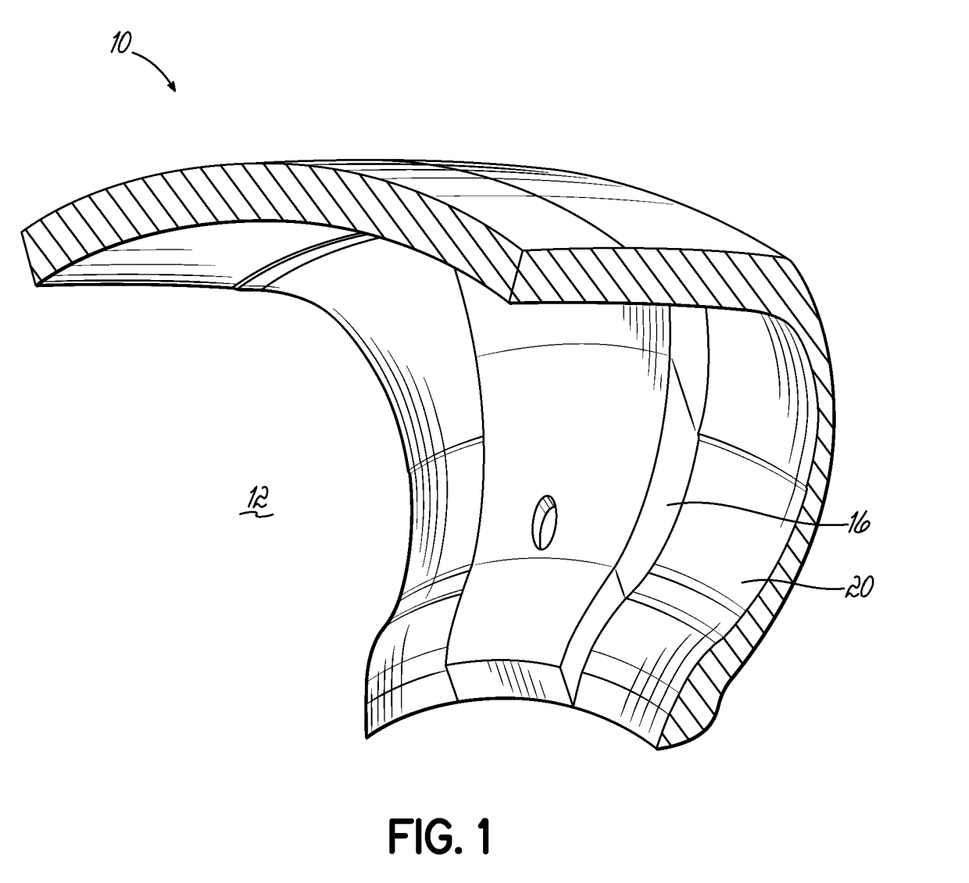
FIG. 1; Schematic perspective view of part of an example assembly in accordance with the present invention.
Figure 2:
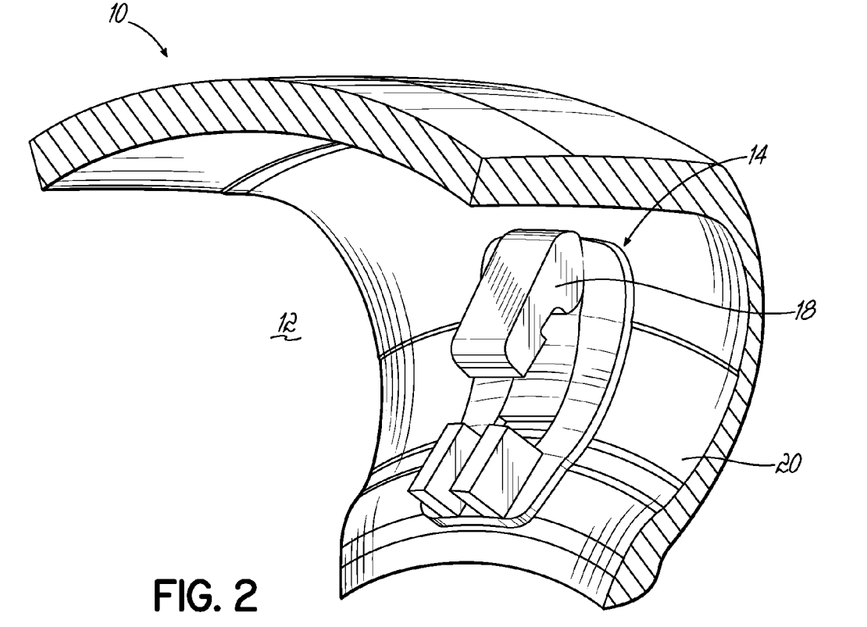
FIG. 2; Schematic perspective view of another part of an example assembly in accordance with the present invention.
Figure 3:
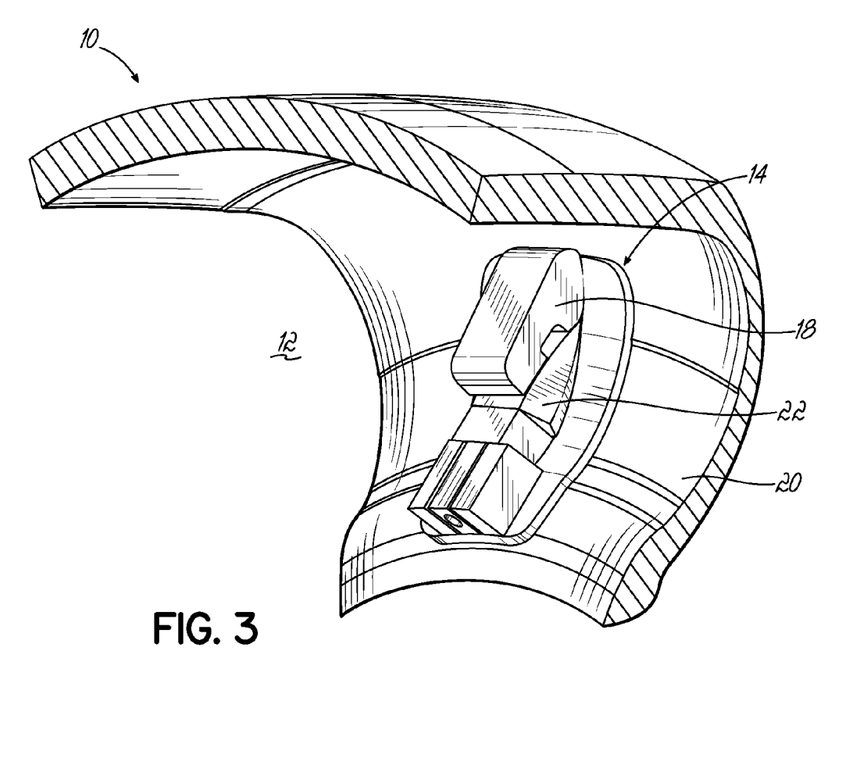
FIG. 3; Schematic perspective view of part of another example assembly in accordance with the present invention.

Such a method is illustrated in FIGS. 1-3. A method in accordance with the present invention may mold a shape for mounting on the inside surface/innerliner 20 of a tire cavity 12 of a pneumatic tire 10. The method may fill a silicone mold/patch 16 with green rubber and place it on the inside of the tire cavity 12 of the green tire. The inner surface of the mold 16 may be shaped inverse correspondingly to the object 22 to be secured/molded to the inside surface/innerliner 20 of the pneumatic tire 10 (FIGS. 2-3). After temporary installation of the silicone mold 16 containing the green rubber on the surface 20 of the green tire, the green tire and silicone mold 16 may be cured in a vulcanizing press. The mold/green rubber may be temporarily secured to the green tire by any suitable method.

The bladder of the vulcanizing press may apply pressure and heat to the silicone mold 16 and surrounding green rubber thereby molding the rubber of the green tire with the appropriate shape and curing/vulcanizing/stabilizing the rubber within and around the silicone mold thereby forming a docking base 14 integral to the inner surface 20 of the pneumatic tire 10 (FIG. 1). The silicone mold 16 may then be removed after the pneumatic tire 10 is removed from the press. Such a method may form a docking base 14 for the hydraulic pump (AMT) 22 described above (FIG. 2). Further, the method may create any fixation system inside the cured pneumatic tire 10 (e.g., for a sensor, a balance weight, an air compressor, etc). Additionally, the silicone mold 16 may shape the rubber of the green tire into a functioning device such as a lever arm 18 for facilitating actuation of a hydraulic pump 22 (FIG. 3). In operation, the inner surface/innerliner/sidewall 20 of the pneumatic tire 10 may flex when adjacent the tire footprint thereby flexing the docking base 14 and lever arm 18. The docking base 14 and lever arm 18 may thus actuate/deform the hydraulic pump 22 periodically or once every rotation of the pneumatic tire 10.

Figure 4:
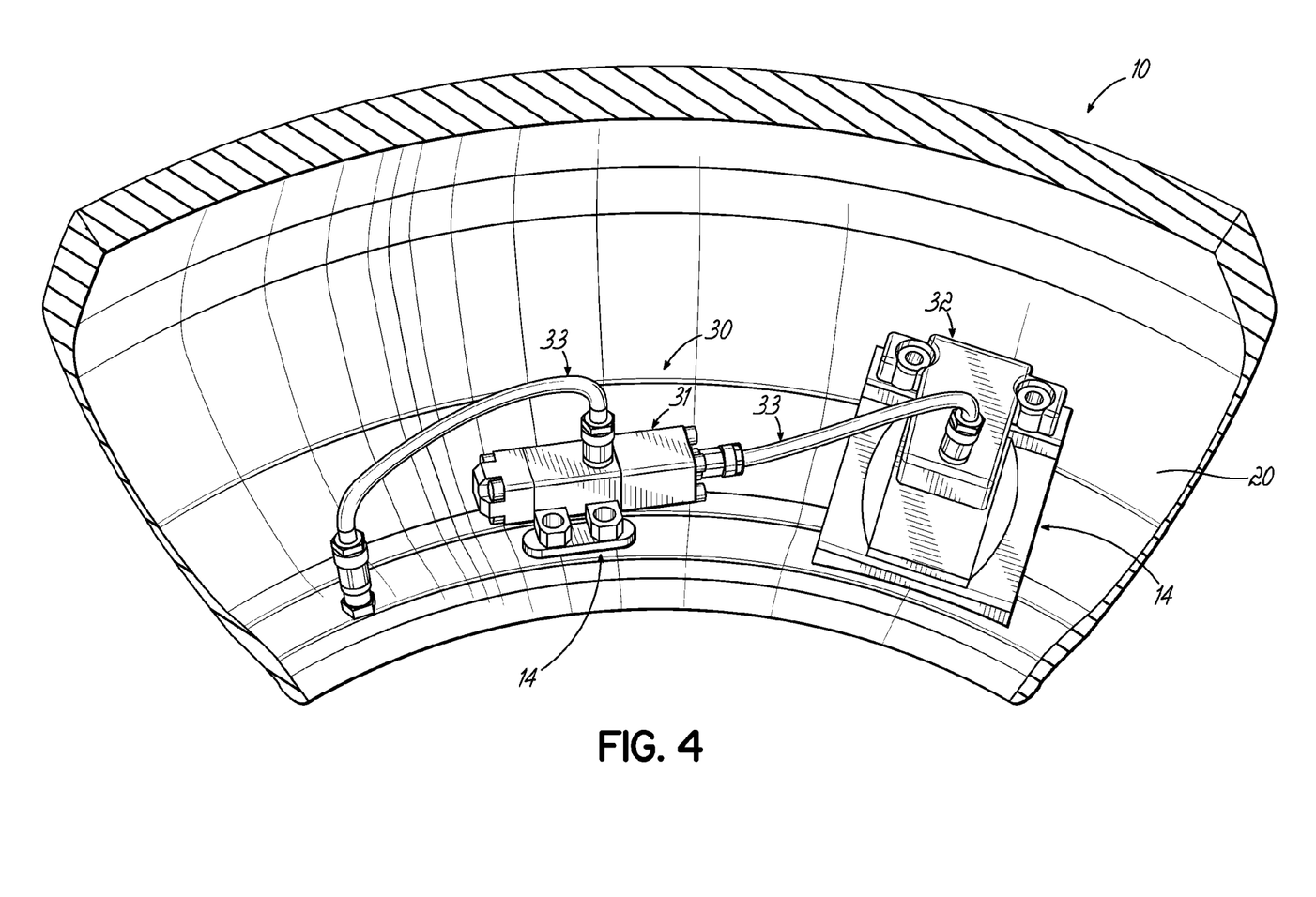
FIG. 4; Schematic perspective view of part of another example assembly in accordance with the present invention.

FIG. 4 shows another device 30, such as a two piece hydraulic pump, installed using the method in accordance with the present invention. The device 30 may include two pieces 31, 32 mounted to the innerliner/sidewall 20 and interconnected by tubing 33. Each piece 31, 32 may be attached to the innerliner/sidewall 20 with its own docking base 14.

Variations in the present invention are possible in light of the description of it provided herein. While certain representative examples and details have been shown for the purpose of illustrating the present invention, it will be apparent to those skilled in this art that various changes and modifications may be made therein without departing from the scope of the present invention. It is, therefore, to be understood that changes may be made in the particular examples described which will be within the full intended scope of the present invention as defined by the following appended claims.

What is claimed is:

1. A method for securing a device to a pneumatic tire, the method comprising the steps of:

filling a mold with green rubber;
positioning the mold and the green rubber within the mold on an inner surface of an inner cavity of a green tire;
temporarily securing the mold and green rubber to the inner surface;
shaping the green rubber of the mold into a lever arm for facilitating operation of the device during rotation of the pneumatic tire under a load;
applying heat and pressure by a bladder to the mold and surrounding green rubber thereby molding the rubber of the green tire and the green rubber within the mold together with an appropriate shape;
locating the green tire within a vulcanizing press;
curing the green tire by the vulcanizing press;
removing the cured tire from the vulcanizing press;
removing the mold from the inner surface; and securing the device to a docking base formed integral to the inner surface by the mold, temporarily securing a second mold and more green rubber to the inner surface prior to curing the green tire;

removing the second mold from the inner surface subsequent to removing the cured tire from the vulcanizing press; and securing a second device to a second docking base formed integral to the inner surface by the second mold.

* * * * *